Aug. 27, 1957  J. R. FAIRWEATHER  2,804,238
GASOLINE DISPENSING APPARATUS
Filed March 2, 1954  2 Sheets-Sheet 2
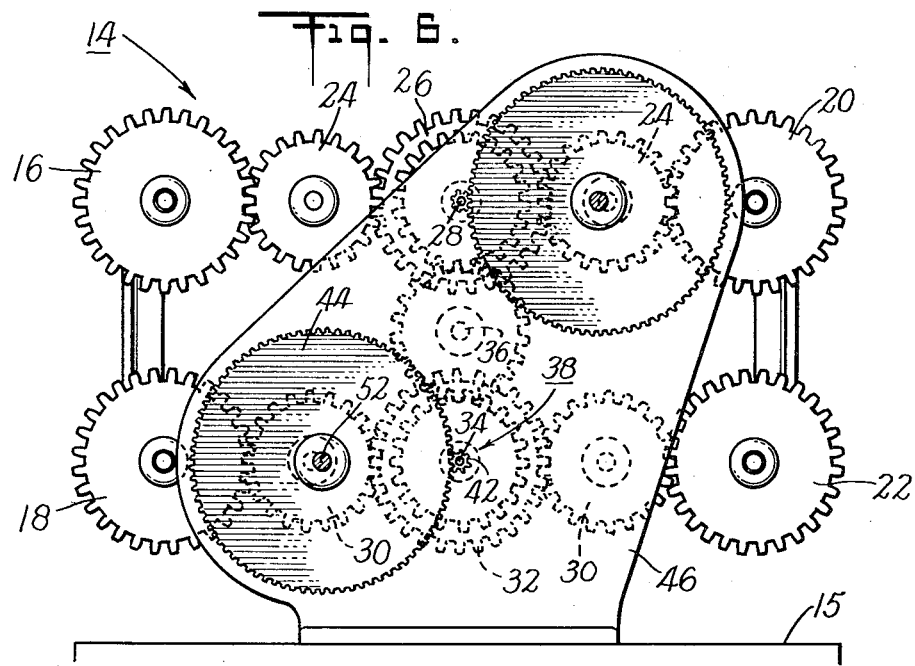
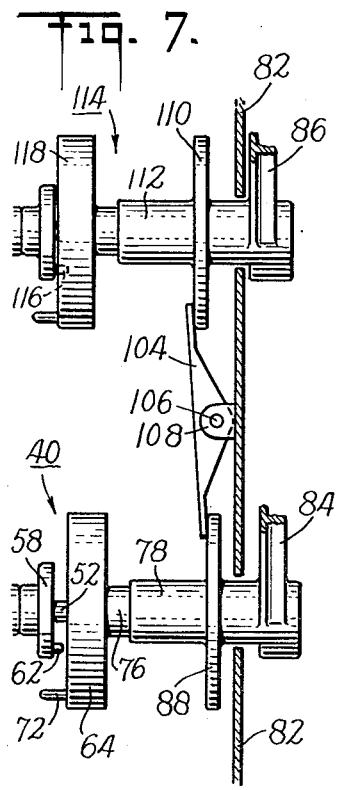
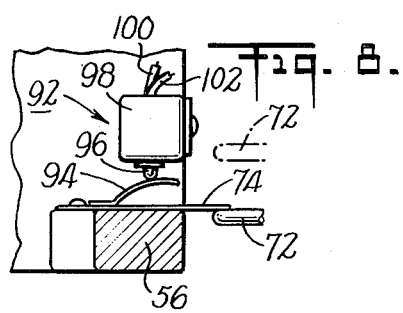
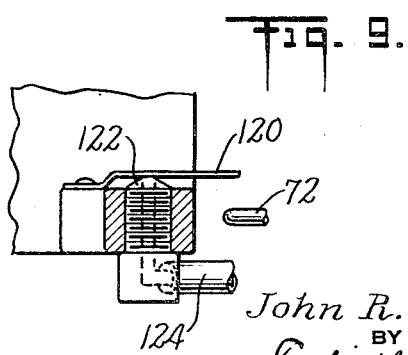
INVENTOR
John R. Fairweather
BY
Curtis, Morris + Safford
ATTORNEYS

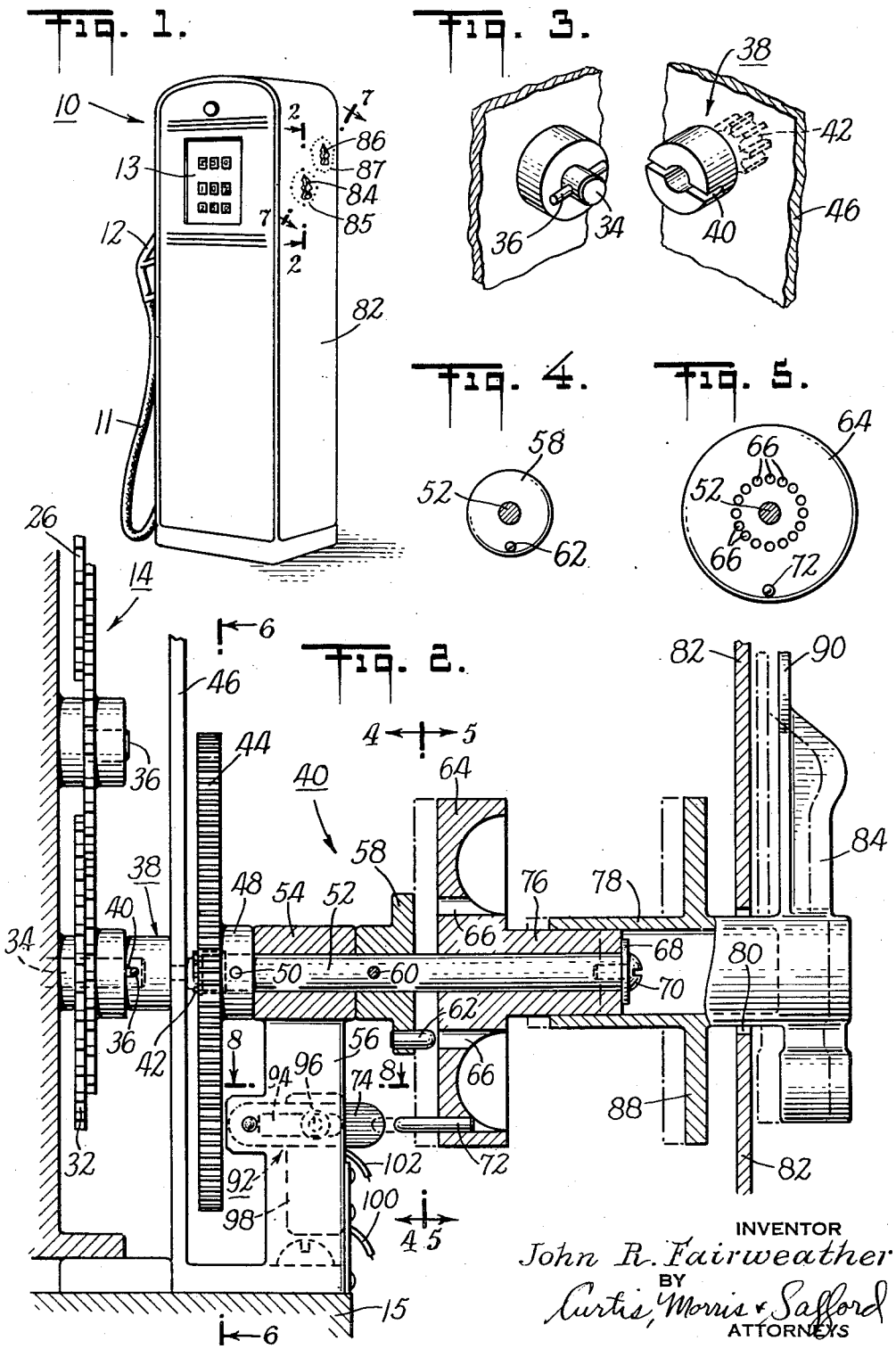

United States Patent Office 2,804,238
Patented Aug. 27, 1957

2,804,238

GASOLINE DISPENSING APPARATUS

John R. Fairweather, Lansdale, Pa.

Application March 2, 1954, Serial No. 413,549

13 Claims. (Cl. 222—17)

This invention relates to gasoline dispensing apparatus, and more particularly to pre-settable apparatus for controlling the amount of gasoline dispensed.

With the rapid and considerable growth of automobile usage, particularly during the past several decades, there has been a corresponding growth in the number of service stations supplying gasoline and other automotive services. During the early years of this growth, these service stations typically supplied gasoline more or less as a sideline to their other activities, predominant among which was the considerable mechanical repair work made necessary by the relatively low state of automotive engineering development. The gasoline dispensing or pumping equipment used at that time was, of course, relatively rudimentary in many ways, for example hand pumping equipment was prevalent for many years, and the volume of gasoline dispensed was generally metered by crude dial-type indicators, or by visually observing the gasoline level in a glass tank.

Such crude metering equipment was not only somewhat inaccurate, but also put a considerable burden on the service station attendant and necessarily caused the customer much inconvenience. For example, the customer typically ordered a specified volume of gasoline, such as five, seven or ten gallons, and after the gasoline had been pumped into the automobile tank the service station attendant was personally required to compute the total cost by multiplying the quantity of gasoline by the price per unit. Almost invariably, the total cost of the gasoline would not turn out to be an even number of dollars, so that the customer was forced into the inconvenience of handling loose change. Also, there would often be disputes about the quantity of gasoline dispensed, as well as about the accuracy of the attendant's calculations.

During recent years, automotive design has progressed to such an extent that mechanical repairs are seldom required, and the service stations have therefore tended more to specialize in selling gasoline, along with oil and other readily saleable items, taking care of minor repair work only as a sideline. As an adjunct to this specialization, and because of the considerable competition in the sale of gasoline, there has been developed greatly superior gasoline dispensing apparatus, for example the relatively new type which automatically and continuously computes the total quantity and cost of the gasoline as it is dispensed, and displays the results of these computations in a clear and accurate manner. With such apparatus, it is now possible for the customer to ask for and receive an amount of gasoline measured in terms of the cost, e. g. one or two dollars worth, and thus avoid the annoyance of handling loose change. Furthermore, these new dispensing equipments have many other advantageous features, for example the computing mechanism may quickly and easily be varied to accommodate a change in gasoline price, the computing counter being readily reset by a simple twise of a lever, and various mechanisms have been added to preclude the possibility of fraud by the station attendant.

The primary aim of much of the recent developments in dispensing apparatus has been to simplify the activities of the station attendant, so that he may be able to handle more automobiles in a given time. Toward this end, the attendant is no longer required personally to compute the cost of the gasoline, he can supply gasoline measured either by volume or by cost, and the dispenser may be reset rapidly to put it in condition for the next customer.

Notwithstanding the many excellent advantages of the presently-used gasoline dispensers, there are some serious limitations involved in their operation, for example, when a customer drives in for gasoline, it is customary for the station to provide him with a number of incidental services, such as cleaning the windshield, checking the oil, battery, water, putting air in the tires, etc. While the attendant is dispensing the gasoline he must pay close attention to the counter indicator, otherwise too much gasoline may be pumped (generally representing a loss to the station). Consequently, even though the attendant is doing essentially nothing except unproductively watching the counter indicator, he cannot during this interval satisfactorily perform any additional function, e. g. the above incidental services. Attempts have been made to solve this problem, for example by "self-service" stations where the customer personally operates the dispenser, but no satisfactory solution has heretofore been proposed.

Accordingly, it is an object of the present invention to provide gasoline dispensing apparatus which avoids these and other problems, and which automatically and without the personal supervision of an attendant dispenses a predetermined volume of gasoline or similar product.

In the embodiment of the invention illustrated herein, a conventional gasoline dispensing apparatus and computing-counter device are provided with pre-settable control mechanisms arranged to cut-off the flow of gasoline after a predetermined volume thereof has been dispensed, or, alternatively, after a predetermined cost equivalent of gasoline has been dispensed. Thus, when a customer orders either a specified number of gallons of gasoline, or a specified ". . . dollars worth," the attendant can preset one of the control mechanisms for the specified order, start the flow of gasoline into the automobile tank, and then proceed to clean the customer's windshield, check the oil, etc., without personally having to de-actuate the pumping mechanism when the order has been filled. With dispensing apparatus constructed in accordance with the present invention, there will be no danger that the gasoline pumped will exceed the customer's order, since the appropriate control mechanism will automatically stop the flow of gasoline at the preset amount.

Other objects and advantages of the invention will be apparent from, or pointed out in, the following specification considered together with the accompanying drawings, in which:

Figure 1 represents a gasoline dispenser provided with a standard computing-counter device equipped with control mechanisms in accordance with the present invention, and showing the preset handle pointers;

Figure 2 is a vertical section of one preset control mechanism taken along line 2—2 of Figure 1, and particularly showing the slidable clutch arrangement;

Figure 3 is a perspective view of a modified computing counter drive shaft and a drive adapter engageable therewith;

Figure 4 is a side section taken along line 4—4 of Figure 2, showing the cut-off drive shaft collar;

Figure 5 is a side section taken along line 5—5 of Figure 2, and shows the clutch wheel;

Figure 6 is a side section taken along line 6—6 of Figure 2, and particularly shows the manner in which the control mechanisms are mounted adjacent to the computing-counter device;

Figure 7 is a sectional view taken along line 7—7 of Figure 1, and shows particularly the interlock arrangement between the cost and quantity control mechanisms;

Figure 8 is a detail view of the cut-off switch mechanism taken along line 8—8 of Figure 2; and Figure 9 shows an alternative form of cut-off switch mechanism.

Figure 1 shows a conventional gasoline dispensing apparatus, generally indicated at 10, and having a hose 11 to the outer end of which is secured a trigger-actuated nozzle 12. On the front face of the gasoline dispenser there is a panel 13 containing the usual indicating numerals which are adapted to display the total quantity of gasoline dispensed, the cost thereof, and the price per unit volume. On the opposite face of the gasoline dispenser (not shown) there is an identical set of indicating numerals, provided so that automobiles may be serviced from either side of the dispenser. At the beginning of the sale, the cost and quantity indicator numerals will be zero, and as the gasoline is pumped into the automobile these numerals will continuously and automatically indicate, in a well known manner, the total quantity of gasoline pumped and the cost thereof.

The indicator numerals are controlled by a device often referred to as a "computing counter." Although many forms of such a device have been developed in the past, to obtain the advantages of standardization the industry has adopted one particular type of computing counter, and this type is generally used throughout the entire country. The various mechanical details of this type of counter are, for example, shown in Patent Nos. 2,203,109, 2,213,597, and 2,264,557 issued to E. A. Slye. The general operation of such a computing counter is well-known there being included in each unit two separate computing sections. The first of these, the quantity counter, is driven directly as a function of the amount of liquid dispensed. The other computing section, the cost counter, is driven through a device known as a variator, or a multiplier, which comprises a series of adjustable gear drives and is set in accordance with the unit price of the gasoline.

Before proceeding with a detailed description of the embodiment of the invention shown herein, a brief overall description will first be presented to acquaint the reader broadly with the manner in which the pre-settable control mechanisms operate. Referring to Figure 1, two manually-operable preset handle pointers 84 and 86 are secured to shafts which extend outwardly from one side wall of the housing 82. Each of these handle pointers is connected to a control mechanism (for example, as generally designated at 40 in Figure 2), and is independently operable to preset the functioning thereof. Surrounding each of the handle pointers is a circular scale 85 and 87 including a series of radially-spaced numerals corresponding to the range of cost and quantity of gasoline typically ordered by customers, e. g. scale 85 ranging from 0 to 16 gallons, and scale 87 ranging from 0 to $5.00. To preset a given cost or ". . . dollars worth" of gasoline, the upper handle 86 is rotated clockwise until it is in register with its pointer tip opposite the numeral on scale 87 which corresponds to the customer's order. The nozzle 12 is then inserted into the automobile filler pipe and the nozzle trigger is actuated to its "lock" position in the usual manner. As the gasoline is dispensed, the cost handle pointer 86 will be driven counterclockwise by mechanisms to be described hereinbelow, until the pointer tip thereof returns to "zero," at which time the gasoline pump is automatically cut-off and the ordered amount of gasoline has been dispensed. Similarly, a given quantity of gasoline may automatically be dispensed by rotating the quantity handle pointer 84 to the desired setting, and proceeding as described below.

The preset control mechanisms located within the dispenser housing 82 are adapted to be operable in conjunction with the standard "computing counter" device (described briefly above) with which virtually all gasoline dispensers now in use are provided. Advantageously, the installation of control mechanisms in accordance with the present invention within the housing of such dispensers is very simple, since there is sufficient space for the added equipment and only minor modifications are required to the structure already present.

The internal functioning of each of the two control mechanisms, i. e. the cost and quantity cut-off control mechanisms, is substantially identical. Briefly, the setting of either one of the handle pointers determines the initial position of a clutch wheel forming a part of the corresponding control mechanism. This clutch wheel is driven, through a slidable clutch mechanism (arranged to be expediently engaged by pressing the handle pointer inwardly towards the housing wall 82) by the corresponding computing counter drive shaft. During a dispensing operation, the latter drive shaft rotates continuously and, through a reduction gearing and the above clutch mechanism, rotates the clutch wheel and the handle pointer secured thereto. In the particular embodiment herein, this clutch wheel carries with it a trip finger which, when the handle pointer returns to its zero position, is arranged to engage and operate a switch, or equivalent means, to disable the gasoline pump and cut off the flow of gasoline automatically.

Referring now to the detailed construction of the embodiment described herein, the outlines and basic gearing of a typical computing counter are shown in Figure 6, and generally designated at 14. Such a computing counter includes four sets of rotatable indicator wheels 16, 18, 20 and 22, each set including three wheels and each wheel having a series of numerals printed on its outer periphery. The numerals on these wheels are visible through small windows on the gasoline dispenser panels 13 (see Figure 1), and indicate the amount of gasoline dispensed and the cost thereof. The upper sets of wheels 16 and 20 typically indicate cost in dollars and cents, while the lower sets of wheels indicate quantity in gallons and tenths of gallon. Two sets of each type of wheels are provided so that the computed figures are viewable from both sides of the dispenser. The two sets of cost wheels 16 and 20 are driven, through intermediate gears 24, by a drive gear 26 secured to the cost counter drive shaft 28. Similarly, the two sets of quantity wheels 18 and 22 are driven, through intermediate gears 30, by a drive gear 32 secured to the quantity counter drive shaft 34. A reset handle (not shown), extending from the rearward side of the computing counter is engageable with a centrally located reset shaft 36. This reset handle is operable to return all of the cost and quantity wheels to zero after an amount of gasoline has been dispensed.

Referring now to Figure 2, there is shown a presettable control mechanism, generally designated at 40, which is arranged to operate in conjunction with the computing counter 14, and which includes various interrelated elements physically disposed between the one side of the computing counter (at the far left hand side of the drawing) and the side housing wall 82. The driving impulse for this control mechanism is obtained from the quantity counter drive shaft 34 shown in the left-hand side of Figure 2.

Although various means may be devised for engaging this shaft 34 without making any substantial modifications to the basic structure of the typical computing counter, one simple and advantageous arrangement is shown in Figure 3. There the end of the shaft 34 is provided with a retaining pin 36, a common construction practice in the manufacture of computing counters. Engageable with this pin 36 is a drive adapter generally indicated at 38, and having a slot 40 in the forward face thereof adapted to fit around and securely grip the pin 36. The drive adapter 38 includes a shaft portion extending through a bearing surface formed in the support plate 46 which, as shown in the lower extremity of Figure 2, is L-shaped and is bolted to a horizontal surface of a pedestal 15 provided as a support for the computing counter 14. Forming a part of this drive adapter 38, on the opposite side of the support plate 46, is a spur gear 42 adapted to engage the teeth of the cut-off drive gear 44 (shown in Figure 2).

The cut-off drive gear 44 is of large diameter relative to the spur gear 42, to provide a gear reduction, and includes a small hub 48 having a centrally located bore to receive one end of the cut-off drive shaft 52. This hub 48 is frictionally or otherwise firmly secured by a locking pin 50 to the cut-off drive shaft 52. The drive shaft 52 extends through and is freely rotatable within a cylindrical bearing 54 secured to a bearing support member 56, the latter being bolted or otherwise fastened to a horizontal surface of the pedestal 15.

On the right hand side of the cylindrical bearing 54, away from the cut-off drive gear 44, a collar 58 is firmly secured to the cut-off drive shaft 50, for example by means of a locking pin 60. The right-hand end of this collar 58 is flared out to form a flange, and, as shown in Figure 2 as well as in Figure 4, this flange is provided with a laterally extending clutch pin 62. To the right of this collar 58 there is secured to the cut-off drive shaft 52, in a freely slidable and rotatable manner, a clutch wheel 64, having (as shown particularly in Figure 5) a series of radially spaced holes 66 extending therethrough. The clutch wheel 64 is slidable to the left on the cut-off drive shaft 52 so as to engage the clutch pin 62 secured to the collar 58 with any one of the holes 66, depending upon the rotary position of the wheel. Sliding movement of the clutch wheel 64 to the right is limited, in that an extended hub portion 76 of the wheel engages a stop plate 68 secured, by a bolt 70, to the right hand end of the cut-off drive shaft 52. Near the outer periphery of the clutch wheel 64 is a laterally extending trip finger 72 which, when the clutch wheel 64 is positioned at its far left-hand extremity of slide motion, is engageable with and operates to control the position of a bendable spring strip 74 in a manner to be explained more fully hereinbelow.

Frictionally or otherwise firmly secured to the outer surfaces of the extended hub portion 76 of the clutch wheel 64 is a hollow shaft 78 which extends through a hole 80 in the dispenser housing wall 82. To the end of this shaft 78 is secured a handle pointer 84, which as described hereinabove is manually settable from without the dispenser. Inwardly of the dispensing housing wall 82, this hollow shaft 78 is provided with an interlock flange 88, which serves in a manner to be explained hereinbelow to prevent both of the cost and quantity control mechanisms from operating simultaneously.

Referring now to Figure 8, the trip finger 72, when driven by the clutch wheel 64, forcibly engages the bendable spring strip 74 and presses it upwardly a slight amount. When this occurs, the motion of the spring strip 74 applies a force to the base of the curved switch arm 94, which is spring-engaged with the head 96 of a slidable contact shaft located within the switch mechanism 98. This switch mechanism 98 may be of conventional design, provided with spring-loading or similar means to force the head 96 outwardly of the contact mechanism, and is adapted to close an electrical circuit between two wire leads 100 and 102 when the head 96 is in its outer or normal position. These wire leads 100 and 102 are connected in the energizing circuit of the gasoline dispenser pump (not shown) in such a way that actuation of the switch 98 de-energizes the pump and immediately prevents or stops the dispensing of gasoline.

Considering now the overall operation of the control mechanism, if for example, a customer requests "10 gallons" of gasoline, the service station attendant will rotate the handle pointer 84 until the tip 90 thereof registers with the 10-gallon marker on the outer surface of the housing wall 82. The handle pointer 84 is then pressed inwardly, thereby causing the clutch wheel 64 to slide along the cut-off drive shaft 52 until one of its radially spaced holes 66 engages the clutch pin 62 on the collar 58. The service station attendant then places the nozzle 12 in the automobile filler pipe, and turns on the gasoline dispenser 10 to its "locked on" condition. As the gasoline flows into the automobile tank, the quantity counter drive shaft 34 will rotate and, through the drive adapter 38, will impart a corresponding rotary motion to the cut-off drive shaft 52 and the collar 58. Since the collar 58 is now engaged with the clutch wheel 64 through the clutch pin 62, the clutch wheel 64 will correspondingly rotate, carrying with it the laterally extending trip finger 72. When the full 10 gallons has been pumped into the automobile gasoline tank, this latter finger 72 will press against the bendable spring strip 74 in such a way as to actuate the electrical switch mechanism 92, which in turn operates to disable the gasoline pump and thereby to cut off the flow of gasoline into the automobile tank.

In the conventional computing counter used in gasoline dispensing apparatus throughout the United States, operation of the reset mechanism produces a small increment of rotation of both the cost and quantity drive shafts. The amount of this movement is substantially independent of the extent of reset, i. e. independent of the volume of gasoline previously dispensed. Advantage has been taken of this characteristic of computing counters, in that resetting of the computing counter automatically closes the contacts of the switch mechanism 92, which closes the energizing circuit of the gasoline pump, and thereby places the gasoline dispenser in condition for immediate operation even though the handle pointers have not been repositioned for automatic cut-off operation. This result is achieved because the additional increment of movement of, for example, the quantity drive shaft 34 is in the same direction as the movement due to the dispensing operation. Accordingly, the increment of movement, due to resetting the computing counter, will provide a small further rotation of the clutch wheel 64 sufficient to carry the finger 72 beyond the bendable spring strip 74, to the position for example shown in broken lines in Figure 8. When this occurs, the bendable strip 74 will snap back into its normal straight position, and the spring-loaded contact mechanism 98 will automatically return to the condition wherein the contacts are closed and an electrical circuit is formed between the wire leads 100 and 102. Therefore, when the control mechanism is in this condition, actuation of the nozzle trigger will energize the gasoline pump and initiate the flow of gasoline.

Since the cost and quantity control mechanisms are independent, in the sense that only one can feasibly be operated at a time, means are advantageously provided for preventing their simultaneous operation. Such simultaneous operation, of course, could result in an improper amount of gasoline being dispensed, if not in actual damage to the equipment itself. Accordingly, referring now to Figure 7, there is provided an interlock mechanism including a rocker arm 104 pivoted about a pin 106 secured by means of a bracket 108 to the dispenser housing wall 82. At its lower extremity, the rocker arm 104 is engageable with the interlock flange 88 formed as a part of the handle shaft 78 of the quantity control mechanism. At its upper extremity, the rocker arm 104 is similarly engaged with the interlock flange 110 formed as a part of the handle shaft 112 of the cost control mechanism. When the interlock is in the position shown in Figure 7, the quantity control mechanism (the lower assembly, generally indicated at 40) is disengaged, i. e. the clutch pin 62 does not extend into any one of the holes formed within the clutch wheel 64. The cost control mechanism (the upper assembly, generally designated at 114) is, however, engaged, in that the clutch pin 116 is within one of the radially spaced holes of the clutch wheel 118.

If, for example, it is desired to operate the quantity control mechanism 40, the pointer handle 84 is merely pressed inwardly toward the housing wall 82 so as to engage the clutch pin 62 in a manner described hereinabove. It will be apparent that the corresponding sliding motion of the handle shaft 78 and the interlock flange 88 will tilt the rocker arm 104 in a clockwise direction; this movement, because of engagement between the rocker arm and the interlock flange 110 of the cost control mechanism, will force the handle shaft 112 outwardly and remove the clutch wheel 118 from engagement with the clutch pin 116. Therefore, it can be seen that the cost and quantity control mechanisms are operable only in a selective manner and, because of the interlock mechanism described above, cannot be operated simultaneously.

Alternative types of switch mechanisms may, within the scope of the invention, be employed to disable the gasoline pump. For example, the trip finger 72 may be arranged to actuate a pilot valve which in turn operates a master cut-off valve to stop the flow of gasoline. For another example, referring now to Figure 9, a pneumatic arrangement may be provided. For this purpose, the movable trip finger 72 may be arranged to contact a bendable flapper arm 120 which is normally positioned so as to cover the mouth of a nozzle 122. This nozzle may, for example, be connected by means of a pipe 124 to any one of a number of standard pneumatic relays, so as to produce a pressure drop in the pipe 124 when the flapper arm 120 is moved by the trip finger 72 in such a way as to open the mouth of the nozzle 122 to atmosphere. This pressure drop may be used to actuate a diaphragm-controlled valve in such a way as to transmit high-capacity, high-pressure air to a bellows or other means for converting pressure into motion, in a well-known way. The resulting motion can, for example, be used to operate a by-pass valve to cause the gasoline pump to circulate the gasoline back into the storage tank rather than out of the dispenser. Or, alternatively, the opening of the nozzle 122 to atmospheric pressure may serve as a bleed for the intake side of the gasoline pump, to disable the pump by reducing its back pressure. Other switching and valving arrangements will be apparent to those skilled in the art.

Since many embodiments might be made of the present invention and since many changes might be made in the embodiment disclosed herein, it is to be understood that the foregoing description is to be interpreted as illustrative only and not in a limiting sense.

I claim:

1. Pre-settable control apparatus adapted for use with gasoline dispensing equipment having a pump arranged to pump gasoline from a storage tank through a dispensing nozzle, and including a computing counter device of the indicating type wherein at least one drive shaft is rotatable in synchronism with the flow of gasoline through said dispenser, comprising, in combination, drive means adapted to be engaged with one of said computing counter drive shafts, a movable trip member adapted to be controlled by said drive means, clutch means interposed between said trip member and said drive means and arranged upon actuation to couple said member and said drive means together, switch means adjacent the path of motion of said movable trip member and having a springable contact arm extending into said path to engage said trip member, said switch means being actuable by said movable trip member to disable said dispenser to stop the flow of gasoline therethrough, and manually-controllable setting means adapted to set the initial position of said strip member, whereby the flow of gasoline from said dispenser causes said drive means to move said pre-positioned trip member toward engagement with said switch means contact arm and, after a predetermined amount of gasoline has been dispensed, to actuate said switch means by forcibly depressing said contact arm thereby to cut-off the flow of gasoline through said dispenser.

2. Pre-settable control apparatus adapted for use with gasoline dispensing equipment having a pump arranged to force gasoline from a storage tank out through a dispensing nozzle, and which includes a computing counter device of the metering type wherein at least one drive shaft is rotatable in synchronism with the flow of gasoline through said dispenser, comprising, in combination, gear means adapted to be coupled to one of said computing counter drive shafts, a control drive shaft driven by said gear means, a clutch mechanism coupled to said control drive shaft, a movable trip member adapted to be driven through said clutch mechanism by said control drive shaft, said trip member forming an integral part of said clutch mechanism, switch means mounted adjacent the path of motion of said movable trip member and actuable by the movement of said member to disable said dispenser and stop the flow of gasoline therethrough, and manually-controllable setting means adapted to set the initial position of said trip member and to actuate said clutch mechanism, whereby the flow of gasoline from said dispenser will be stopped after a preset amount has been pumped, said trip member being positioned intermediate said setting means and said gear means.

3. Pre-settable control apparatus adapted for use with gasoline dispensing equipment having a pump arranged to pump gasoline from a storage tank through a dispensing nozzle, and including a computing counter of the indicating type wherein at least one drive shaft is rotatable in synchronism with the flow of gasoline through said dispenser, comprising, in combination, gear means adapted to be coupled to one of said computing counter drive shafts, a control drive shaft driven by said gear means, a manually-engageable clutch mechanism coupled to said control drive shaft, a movable trip member adapted to be driven through said clutch mechanism by said control drive shaft, switch means mounted adjacent the path of motion of said movable trip member, a springable contact arm secured to said switch means and extending into said path of motion and actuable by said member to operate said switch means to disable said dispenser and stop the flow of gasoline therethrough, and manually-controllable setting means adapted to set the initial position of said trip member, whereby the flow of gasoline from said dispenser will move said trip member into engagement with said contact arm after a predetermined amount has been pumped out of said nozzle, and the dispenser will thereby automatically be disabled and the flow of gasoline will cease.

4. Pre-settable control apparatus adapted for use with gasoline dispensing equipment having a pump arranged to pump gasoline from a storage tank through a dispensing nozzle, and including a conventional computing counter of the indicating type wherein at least one drive shaft is rotated in synchronism with the flow of gasoline through said dispenser, comprising, in combination, gear means engageable with one of said computing counter drive shafts, a control drive shaft rotatable by said gear means and having a collar firmly secured thereto, a laterally extending clutch pin secured adjacent the outer periphery of said collar, a clutch wheel rotatably and slidably secured to said control drive shaft and having a series of radially-spaced holes therein adapted individually to engage said clutch pin, a trip member secured to said clutch wheel and movable therewith, switch means positioned adjacent the path of movement of said trip member and actuable by said member to disable said dispenser to stop the flow of gasoline therethrough, and manually-controllable setting means secured to said clutch wheel and adapted to set the initial position thereof and to slide said wheel into and out of engagement with said clutch pin, whereby when said clutch wheel engages said clutch pin, the flow of gasoline through said dispenser rotates said clutch wheel to engage said trip member with said switch means after a predetermined amount of gasoline has been dispensed and thereby stops the dispensing operation.

5. Pre-settable control apparatus adapted for use with gasoline dispensing equipment having a pump arranged to pump gasoline from a storage tank through a dispensing nozzle, and including a conventional computing counter of the metering type wherein at least one drive shaft is rotated in synchronism with the flow of gasoline through said dispenser, comprising, in combination, gear means engageable with one of said computing counter drive shafts, a control drive shaft rotatable by said gear means and having a collar firmly secured thereto, a clutch wheel rotatably and slidably secured to said control drive shaft, manually-operable means for engaging said clutch wheel and said collar firmly together in a positive slipless connection, a trip member secured to said clutch wheel and movable therewith, switch means positioned adjacent the path of movement of said trip member and actuable by said member to disable said dispenser to stop the flow of gasoline therethrough, and manually-controllable setting means adapted to set the initial position of said clutch wheel, whereby when said clutch wheel engages said collar, the flow of gasoline through said dispenser rotates said clutch wheel to engage said trip member with said switch means after a perdetermined amount of gasoline has been dispensed and thereby stops the dispensing operation.

6. Pre-settable apparatus for automatically cutting off the flow of gasoline from a gasoline dispenser after a predetermined volume or money amount has been dispensed, and adaptable for use with conventional computing counters of the indicator type having cost and quantity drive shafts rotatable in synchronism with the flow of gasoline pumped by said dispenser, comprising, in combination, a cost control mechanism and a quantity control mechanism, each of said mechanisms including: a gear member adapted to be mechanically secured to the corresponding one of said drive shafts, a switch device operative upon actuation to disable said dispensing apparatus to stop the flow of gasoline therethrough, a movable trip member drivable by said gear member through a clutch mechanism and operable to actuate said switch device, and a manually-positionable handle for setting the initial position of said trip member prior to starting the flow of gasoline through said dispenser and adapted to control the engagement of said clutch mechanism, whereby the flow of gasoline through said dispenser moves said trip member from its initial set position to engagement with said switch device and thereby actuates said switch device to cut-off the flow of gasoline through said dispenser after an amount has been dispensed in accordance with the initial setting of said trip member.

7. Pre-settable apparatus for automatically cutting off the flow of gasoline from a gasoline dispenser after a predetermined volume or money amount has been dispensed, and adaptable for use with conventional computing counters of the indicator type having cost and quantity drive shafts rotatable in synchronism with the flow of gasoline pumped by said dispenser, comprising, in combination, a cost control mechanism and a quantity control mechanism, each of said mechanisms including: drive means adapted to be secured to the corresponding one of said cost and quantity drive shafts, a switch device operative upon actuation to disable said dispensing apparatus to stop the flow of gasoline therethrough, switch trip means drivable by said drive means through a manually-engageable clutch mechanism and operable to actuate said switch device, and a manually-positionable setting handle for setting the initial position of said trip means prior to starting the flow of gasoline through said dispenser, whereby the flow of gasoline through said dispenser moves said switch trip means from its initial set position to engagement with said switch device and thereby actuates said switch device to cut-off the flow of gasoline through said dispenser after an amount has been dispensed in accordance with the initial setting of said trip means; there being also provided an interlock member adapted to engage each of said control mechanisms and automatically operable to prevent the functioning of one of said control mechanisms when the other of said mechanisms has been preset to function to control the amount of gasoline dispensed.

8. Pre-settable apparatus for automatically cutting off the flow of gasoline from a gasoline dispenser after a predetermined amount has been dispensed, and adaptable for use with conventional computing counters of the indicator type having cost and quantity drive shafts rotatable in synchronism with the flow of gasoline pumped by said dispenser, comprising, in combination, a cost control mechanism and a quantity control mechanism, each of said mechanisms including: gear means adapted to be secured to one of said drive shafts, switch means operative upon actuation to disable said dispensing apparatus to stop the flow of gasoline therethrough, a trip member drivable by said gear means through a manually-engageable clutch mechanism and operable thereby to actuate said switch means, and a manually rotatable handle for setting the initial position of said trip member prior to starting the flow of gasoline through said dispenser, whereby the flow of gasoline through said dispenser moves said trip member from its initial set position to engagement with said switch means and thereby actuates said switch means to cut-off the flow of gasoline through said dispenser after an amount has been dispensed in accordance with the initial setting of said trip member; said presettable apparatus also being provided with a rockable interlock member comprising an arm pivoted about a central point thereof, the ends of said arm being engageable with the shafts of each of said handles so that when one of said handles has been moved in a direction to engage the clutch mechanism associated therewith, the other of said handles will be forced in a direction to disengage the clutch mechanism associated therewith.

9. Pre-settable control apparatus adapted for use with gasoline dispensing equipment having a pump arranged to pump gasoline from a storage tank out through a dispensing nozzle, and including a computing counter device of the indicating type wherein at least one drive shaft is rotatable in synchronism with the flow of gasoline through said dispenser, comprising, in combination, rotatable drive means adapted to be connected to one of said computing counter drive shafts, a movable support member to be driven by said drive means, clutch means interposed between said support member and said drive means and arranged to couple said member and said drive means together, a trip element mounted on said support member for movement therewith, a pump cut-off mechanism adjacent the path of motion of said trip element, a contact arm forming part of said pump cut-off mechanism and extending away therefrom into said path to engage said trip element when said element has been moved by said support member into a predetermined position, said contact arm being shiftable by said trip element so as to actuate said pump cut-off mechanism and thereby disable said dispenser to stop the flow of gasoline therethrough, and manually-controllable setting means adapted to set the initial position of said trip element relative to said contact arm prior to the initiation of a pumping operation, whereby the flow of gasoline from said dispenser causes said drive means to move said pre-positioned trip element toward engagement with said contact arm and, after a predetermined amount of gasoline has been dispensed, to actuate said pump cut-off mechanism by forcibly depressing said contact arm thereby to cut off the flow of gasoline through said dispenser.

10. Pre-settable control apparatus adapted for use with gasoline dispensing equipment having a pump arranged to pump gasoline from a storage tank out through a dispensing nozzle, and which includes a computing counter device of the metering type wherein at least one drive shaft is rotatable in synchronism with the flow of gasoline through said dispenser comprising, in combination, drive coupling means adapted to be connected to one of said computing counter drive shafts, a control shaft rotatable by said drive coupling means, a clutch mechanism having input and output sections, said input section being connected to said control shaft and drivable thereby, a rotatable support member integral with said output section of said clutch mechanism and adapted to be driven through said clutch mechanism by said control drive shaft, a trip element secured to said support member at a substantial distance away from the rotational axis thereof, a pump disabling mechanism mounted adjacent said rotatable support member, said disabling mechanism including a sensing arm extending into the path of movement of said element and actuable by the movement of said element to disable said dispenser and stop the flow of gasoline therethrough, and manually-controllable setting means adapted to set the initial position of said trip element relative to said sensing arm prior to starting the flow of gasoline through said dispensing equipment, whereby the flow of gasoline from said dispenser will be stopped by actuation of said sensing arm after a preset amount has been pumped, said rotatable support member with said trip element being located between said setting means and said drive coupling means.

11. Pre-settable control apparatus adapted for use with gasoline dispensing equipment having a pump arranged to force gasoline from a storage tank out through a dispensing nozzle, and which includes a computing counter device of the metering type wherein at least one drive shaft is rotatable in synchronism with the flow of gasoline through said dispenser comprising, in combination, drive coupling means adapted to be connected to one of said computing counter drive shafts, a control shaft rotatable by said drive coupling means, a clutch mechanism having input and output sections, said input section being connected to said control shaft and drivable thereby, a rotatable output shaft integral with said output section of said clutch mechanism and adapted to be driven through said clutch mechanism by said control drive shaft, a trip element integral with said output shaft at a substantial distance away from the rotational axis thereof, a pump disabling mechanism mounted adjacent said trip element, said disabling mechanism including a sensing arm extending into the path of movement of said element and actuable by the movement of said element to disable said dispenser and stop the flow of gasoline therethrough, and manually-controllable setting means integral with said output shaft and adapted to set the initial position of said trip element relative to said sensing arm prior to starting the flow of gasoline through said dispensing equipment, whereby the flow of gasoline from said dispenser will be stopped by actuation of said sensing arm after a preset amount has been pumped, said output shaft and said clutch mechanism being physically located between said setting means and said control shaft, said clutch mechanism and said setting means being arranged in such a manner that said trip element may be moved by said setting means relative to said sensing arm without transmitting any corresponding motion back through said clutch mechanism to said drive coupling means.

12. Pre-settable apparatus for automatically cutting off the flow of gasoline from a gasoline dispenser after a predetermined volume or money amount has been dispensed, and adaptable for use with conventional computing counters of the indicator type having cost and quantity drive shafts rotatable in synchronism with the flow of gasoline pumped by said dispenser, comprising, in combination, a cost control mechanism and a quantity control mechanism, each of said mechanisms including: a control shaft adapted to be mechanically engaged with a corresponding one of said drive shafts, a clutch secured to said control shaft, a movable support member drivable by said control shaft through said clutch, a trip element integral with said support member, a pump cut-off device operative upon actuation to disable said dispensing apparatus to stop the flow of gasoline therethrough, a sensing arm forming part of said cut-off device and extending into the path of movement of said trip element, said sensing arm being arranged to actuate said cut-off device when moved by said trip element, and manually-positionable setting means for establishing the initial position of said trip element prior to starting the flow of gasoline through said dispenser, whereby the flow of gasoline through said dispenser moves said trip element from its initial set position to engagement with said sensing arm and thereby actuates said cut-off device to disable said dispenser after an amount has been dispensed in accordance with the initial setting of said trip element.

13. Pre-settable apparatus for automatically cutting off the flow of gasoline from a gasoline dispenser after a predetermined volume or money amount has been dispensed, and adaptable for use with conventional computing counters of the indicator type having cost and quantity drive shafts rotatable in synchronism with the flow of gasoline pumped by said dispenser, comprising, in combination, a cost control mechanism and a quantity control mechanism, each of said mechanisms including: a control shaft adapted to be mechanically engaged with the corresponding one of said drive shafts, a clutch having input and output sections, said input section being secured to said control shaft, a rotatable output shaft having one end integrally secured to said clutch output section and drivable through said clutch by said control shaft, a trip element integral with said output shaft and movable therewith, a pump cut-off device operative upon actuation to disable said dispensing apparatus to stop the flow of gasoline therethrough, a sensing arm forming part of said cut-off device and extending into the path of movement of said trip element, said sensing arm being arranged to actuate said cut-off device when moved by said trip element, and manually-positionable setting means integrally engaged with the end of said output shaft that is remote from said clutch, said setting means being operable to establish the initial position of said trip element prior to starting the flow of gasoline through said dispenser, whereby the flow of gasoline through said dispenser moves said trip element from its initial set position to engagement with said sensing arm and thereby actuates said cut-off device to disable said dispenser after an amount has been dispensed in accordance with the initial setting of said trip element.

References Cited in the file of this patent

UNITED STATES PATENTS

| Number | Name | Date |
|---|---|---|
| 874,573 | Davis | Dec. 24, 1907 |
| 2,180,821 | Ginnel | Nov. 21, 1939 |
| 2,223,146 | Yeomans | Nov. 26, 1940 |
| 2,305,221 | Mangan | Dec. 15, 1942 |